(12) United States Patent
Yamaji et al.

(10) Patent No.: US 10,056,982 B2
(45) Date of Patent: Aug. 21, 2018

(54) METHOD OF COUPLING OPTICAL SIGNAL OPTICALLY WITH OPTICAL WAVEGUIDE THROUGH TWO LENS SYSTEM

(71) Applicant: Sumitomo Electric Industries, Ltd., Osaka-shi (JP)

(72) Inventors: Kazuhiro Yamaji, Yokohama (JP);
Tomoya Saeki, Yokohama (JP);
Manabu Shiozaki, Yokohama (JP);
Yasushi Fujimura, Yokohama (JP);
Munetaka Kurokawa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/850,935

(22) Filed: Dec. 21, 2017

(65) Prior Publication Data
US 2018/0138986 A1 May 17, 2018

Related U.S. Application Data

(62) Division of application No. 14/523,374, filed on Oct. 24, 2014, now Pat. No. 9,887,783.

(51) Int. Cl.
*H04B 10/00* (2013.01)
*H04B 10/67* (2013.01)
(Continued)

(52) U.S. Cl.
CPC ......... *H04B 10/67* (2013.01); *B29D 11/0075* (2013.01); *G02F 1/01708* (2013.01); *G02F 1/025* (2013.01); *H04B 10/152* (2013.01); *G02B 6/30* (2013.01); *G02B 6/32* (2013.01)

(58) Field of Classification Search
CPC . G02B 6/10; G02B 6/107; G02B 6/12; G02B 6/12004; G02B 6/26; G02B 6/32;
(Continued)

(56) References Cited

U.S. PATENT DOCUMENTS 7,693,372 B2 * 4/2010 Kaneko ................. G02B 6/422
385/33
2002/0118463 A1 8/2002 Wu et al.
(Continued)

FOREIGN PATENT DOCUMENTS

CN 101416114 A 4/2009
JP H01-101511 A 4/1989
(Continued)

OTHER PUBLICATIONS

Notification of the First Office Action in counterpart Chinese Patent Application No. 201410589684.3, dated Jan. 4, 2017.

*Primary Examiner* — Daniel Dobson
(74) *Attorney, Agent, or Firm* — Venable LLP; Michael A. Sartori; Miguel A. Lopez

(57) ABSTRACT

An optical coupling system to couple a collimated beam with a waveguide made of semiconductor materials is disclosed. The waveguide is implemented in an optical modulator and/or an optical hybrid, and has a core with a restricted cross section because of the enhanced refractive index of the semiconductor materials. The collimated beam is focused on the core by the two-lens system including first and second lenses. The first lens, having a focal length shorter than a focal length of the second lens, is first aligned with the core, then, the second lens is aligned with the core as compensating deviations of the first lens induced during the fixation thereof.

7 Claims, 10 Drawing Sheets

(51) Int. Cl.
  *B29D 11/00* (2006.01)
  *G02F 1/017* (2006.01)
  *G02F 1/025* (2006.01)
  *H04J 14/00* (2006.01)
  *G02B 6/30* (2006.01)
  *G02B 6/32* (2006.01)

(58) Field of Classification Search
  CPC ...... G02B 6/42; G02B 6/4204; G02B 6/4203; G02B 6/4219; G02B 6/422; G02B 6/4228; G02B 6/4239; G02B 6/4244; H04B 10/61; H04B 10/611; H04B 10/613; H04B 10/615; H04B 10/63; H04B 10/64
  See application file for complete search history.

(56) References Cited

U.S. PATENT DOCUMENTS

| | | | |
|---|---|---|---|
| 2004/0151441 A1* | 8/2004 | Bennett | G02B 6/421 385/92 |
| 2006/0239605 A1 | 10/2006 | Palen et al. | |
| 2010/0054761 A1* | 3/2010 | Chen | H04B 10/60 398/212 |
| 2011/0235971 A1 | 9/2011 | Hashimoto | |
| 2015/0260915 A1 | 9/2015 | Kitamura et al. | |
| 2015/0286121 A1 | 10/2015 | Kilcher et al. | |

FOREIGN PATENT DOCUMENTS

| | | |
|---|---|---|
| JP | 2014-186127 A | 10/2014 |
| WO | 2005/022522 A1 | 3/2005 |

\* cited by examiner

METHOD OF COUPLING OPTICAL SIGNAL OPTICALLY WITH OPTICAL WAVEGUIDE THROUGH TWO LENS SYSTEM

CROSS REFERENCE TO RELATED APPLICATION

This is a Divisional Application of U.S. patent application Ser. No. 14/523,374 filed on Oct. 24, 2014, which is fully incorporated herein by reference.

BACKGROUND OF THE INVENTION

1. Field of the Invention

The present application relates to a lens system for a collimated optical beam to enhance the optical coupling efficiency to an optical waveguide.

2. Background Arts

A technique to form a planar optical circuit (PLC) by semiconductor materials has been popular in the field. A conventional PLC is typically made of dielectric material such as lithium niobate ($LiNbO_3$). Because the refractive index of most semiconductor materials is greater than that of $LiNbO_3$, the PLC made of semiconductor materials reduces not only a plane size thereof but a cross section thereof. The optical waveguide with a mesa structure has effective dimensions determined by a width of the mesa and a thickness of a waveguide layer. The former dimension extends to several micron-meters (μm) but the latter is forced to be limited to sub-micron meters.

Conventionally known technique to enhance the optical coupling efficiency with the optical waveguide is to provide a spot-size converter (SSC) in a vicinity of an end surface of a mother material on which the optical waveguide exposes. The SSC may equivalently expand the cross section of the optical waveguide. However, an SSC inherently has complicated structures, which raises a production cost of the optical waveguide.

SUMMARY OF THE INVENTION

One aspect of the present application relates to a method of coupling a collimated beam with a core of an optical waveguide that is made of semiconductor materials, where the core has sub-micron dimensions. The method comprises steps of: (a) aligning a first lens with the core by concentrating the collimated beam on the core; (b) fixing the first lens by curing an ultraviolet curable resin attached to the first lens and subsequently heat-treating the ultraviolet curable resin to harden the resin; (c) compensating deviations induced in the first lens during the fixation thereof by setting the second lens outside of the first lens with respect to the optical waveguide; and (d) fixing the second lens by curing an ultraviolet curable resin attached to the second lens and subsequently heat-treating the ultraviolet curable resin for the second lens to harden the resin.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENTS

Figure 1:
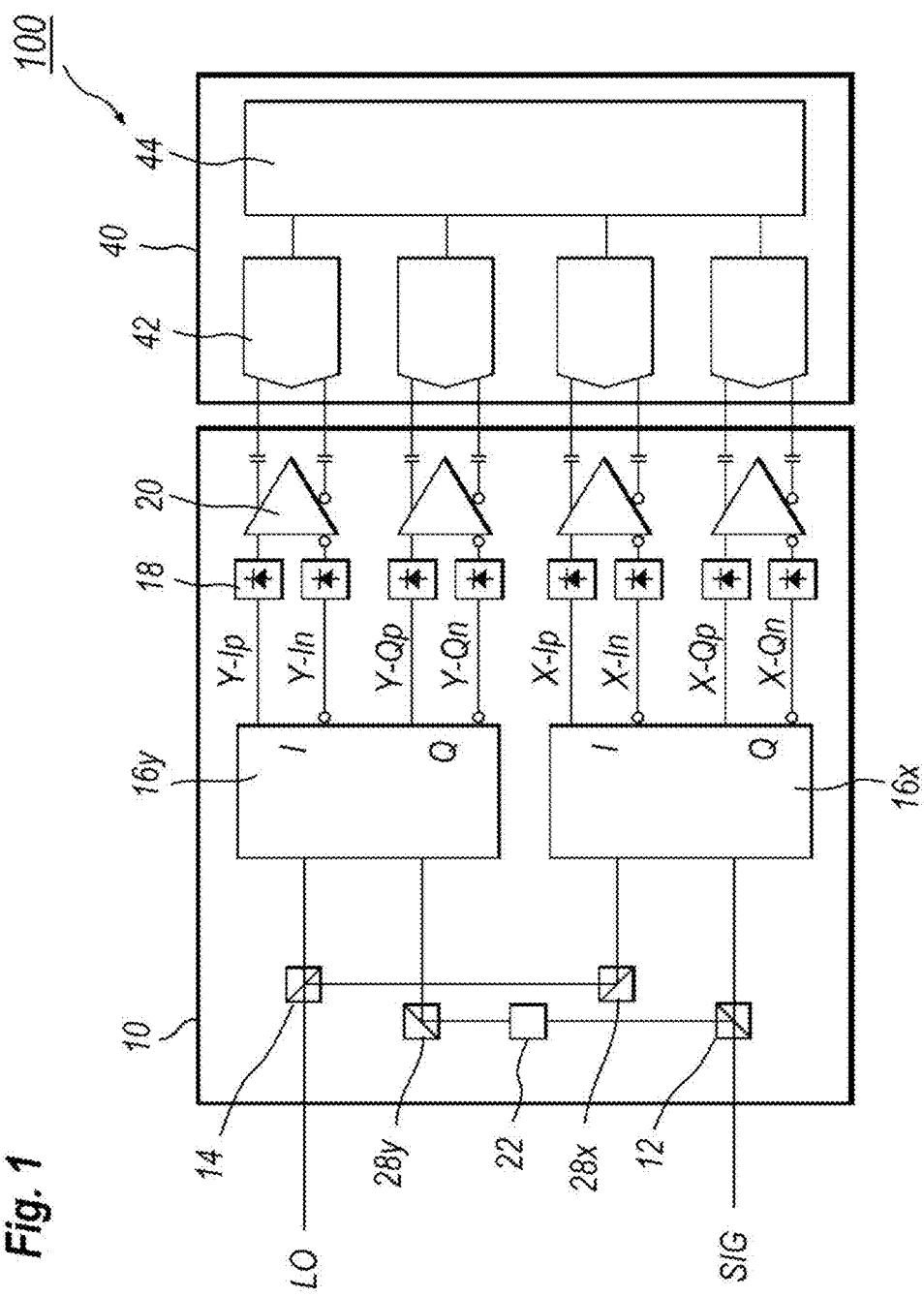
FIG. 1 schematically illustrates a functional block diagram of an optical receiver.

FIG. 1 schematically illustrates a functional block diagram of an optical receiver, where the optical receiver 100 is applicable to the coherent optical communication system. The optical receiver 100 includes primarily an optical unit 10 and an electrical unit 40 provided in downstream of the optical unit 10.

The optical unit 10 includes a polarization beam splitter (PBS) 12, a beam splitter (BS) 14, two optical hybrids 16, a plurality of light-receiving devices 18, amplifiers 20, a half-wave plate 22 and two mirrors, 24a and 24b. The optical unit 10 may further provide an optical device to compensate skews between two channels split by the PBS 12 and the BS 14, which may be caused by lenses, mirrors, and so on; but FIG. 1 omits those optical devices to adjust skews. The electrical unit 40 includes analog-to-digital converters (A/D-C) 42 and a digital signal processor (DSP) 43.

The BBS 12 splits an optical signal SIG provided from the single mode fiber (SMF) into two beams each having the X-polarization and the Y-polarization, where the specification assumes that X-polarization is in the plane parallel to the primary surface of the optical unit 10, while the Y-polarization is in perpendicular to the primary surface. One of the beams with the X-polarization enters the X-hybrid 16x; while, the other having the Y-polarization enters another hybrid, the Y-hybrid 16y, after rotating the polarization thereof by 90° by the half-wave plate 22.

The BS 14 splits the local beam (LO), which is provided from a local optical source through a polarization maintaining fiber (PMF), into two optical beams. The local beam LO in the polarization thereof is set in the X-polarization, that is, the polarization is matched with the polarization of the optical beam entering the x-hybrids 16x and that entering the y-hybrids 16y by passing the half-wave plate 22.

The respective hybrids, 16x and 16y, multiply respective beams derived from the optical signal SIG and beams from the local beam LO, and output thus processed beams from the output ports. Specifically, the X-hybrid 16x interferes or multiples the beam derived from optical signal SIG with the beam derived from the local beam LO, extracts an in-phase component and an out-phase component contained in the optical single SIG. The former component, which is called as In-phase component, corresponds to the component of the signal SIG whose phase matches with the phase of the local signal LO, while, the latter component, which is called as Quadrature component, corresponds to one having the phase different by 90° from the phase of the local beam LO. Each of these components is output as the differential form. Similarly, the Y-hybrid 16y outputs the in-phase component and the quadrature component of the signal SIG with the Y-polarization. Each of these components is also output by the differential form. That is, the X-hybrid 16x may output the In-phase component by the differential form, namely, X-Ip and X-In, the quadrature component also by the differential form, X-Qp and X-Qn. The Y-hybrid 16y outputs two components each having the differential form, Y-Ip and Y-In, and Y-Qp and Y-Qn. The two hybrids, 16x and 16y, may be a type of the PLC formed on a silica substrate.

The light-receiving devices 18, which may be photodiodes (PDs), convert respective optical beams output from the hybrids, 16x and 16y, into photocurrents. The amplifiers 20 each differentially amplifies the complementary signals output from the PDs 18. The amplifiers 20 may have an arrangement of, what is called, the trans-impedance amplifier (TIA) to convert the current signal into a voltage signal. The outputs of respective amplifiers are provided to the electrical unit 40 to be electrically processed therein.

The A/D-Cs 42 converts the analog voltage signals each output from the TIAs 42 into digital signals. The DSP 44 processes the digital signals thus converted by the A/D-Cs 42 to adjust the phase and the wavelength of the local beam LO and so on with respect to the signal SIG for realizing the coherent optical communication.

First Embodiment

Figure 2:
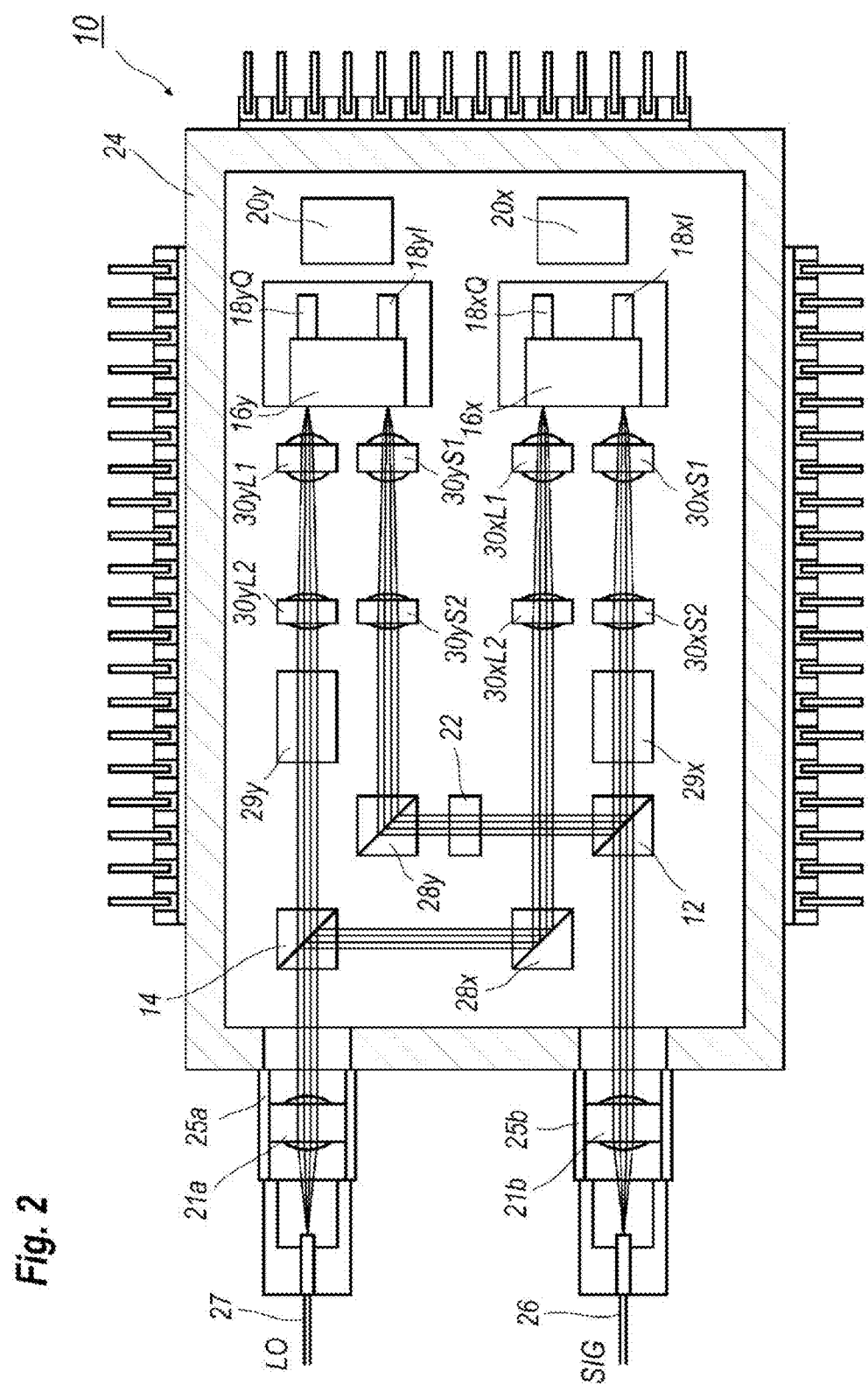
FIG. 2 schematically illustrates a plan view of an inside of the optical receiver according to the first embodiment of the present invention.

FIG. 2 schematically illustrates a plan view of an inside of the optical receiver 10 according to the first embodiment of the present invention. FIG. 2 shows only the optical unit 10 and omits the electrical unit 40 in FIG. 1. Elements in the optical receiver 10 similar to or same with those shown in FIG. 1 are referred by symbols or numerals same with or similar to those appearing in FIG. 1 without duplicated explanations.

One of the input ports 25b receives a single mode fiber (SMF) for receiving an incoming signal SIG; while, the other input port 25a receives a polarization maintaining fiber (PMF) 27 to receive the local beam LO. The input ports, 25a and 25b, provide respective collimating lenses, 21a and 21b. The housing 24 installs, in addition to elements shown in FIG. 1, some optical components such as mirrors, 28x and 28y, passive devices, 29x and 29y, to adjust skews, lenses, 30xS1 to 30yL2, and so on. The mirrors, 28x and 28y, and the passive devices, 29x and 29y, are provided for the respective optical hybrids, 16x and 16y. Total of eight (8) lenses, 30xS1 to 30yL2, are implemented. Respective optical paths entering the optical hybrids, 16x and 16y, provide a pair of lenses 30.

The PBS 12 splits the optical signal SIG provided from the SMF 26 into two beams depending on the polarization directions, one of the two beams which has the X-polarization and passes the PBS 12 enters the optical hybrid 16x as passing the passive device 29x and concentrated by two lenses, 30xS2 and 30xS1. While, the other beam bent by the PBS 12 enters the other optical hybrid 16y as passing the half wave-plate 22, reflected by the mirror 28y and concentrated by two lenses, 30yS2 and 30yS1.

The local beam LO provided from the PMF 27 is evenly split into two beams by the BS 14, one of the two beams which is bent by the BS 14 enters the first optical hybrid 16x as bent again by the mirror 28x and concentrated by two lenses, 30xL2 and 30xL1. The other beam passing the BS 14 enters the other optical hybrid 16y as passing the passive device 39y to adjust the skew and concentrated by two lenses, 30yL2 and 30yL1.

For the optical hybrid 16x, the optical path for the local beam LO is longer than the optical path for the signal SIB by a distance from the BS 14 to the mirror 28x. Accordingly, the passive device 29x is put in the optical path for the signal SIG to adjust the skew or the phase between two optical beams, that is, the passive device 29x delays the phase of the signal SIG. On the other hand, for the optical hybrid 16y, the optical path of the signal SIG is longer that the optical path of the local beam LO by a distance from the BS 12 to the mirror 28y. Therefore, another passive device 29y is put in the optical path of the local beam LO to adjust the skew or the phase between two beams, that is, the passive device 29y delays the phase of the local beam LO. The passive devices, 29x and 29y, may be made of glass, silicon, and so on, where they are substantially transparent for two optical beams, SIG and LO.

Figure 3:
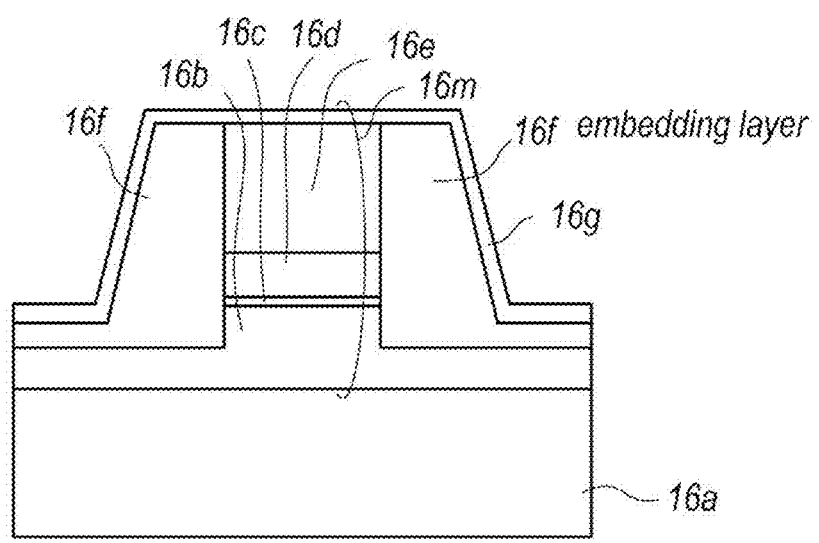
FIG. 3 shows a cross section of an optical waveguide.

Each of the optical hybrids, 16x and 16y, provides waveguides to guide optical beams entering therein to a multi-mode interference (MMI) coupler to perform the multiplying process between these two beams. The waveguide is exposed in a facet of each of the optical hybrids, 16x and 16y. FIG. 3 shows a cross section of an optical waveguide of the present embodiment. The optical hybrid, 16x or 16y, of the present embodiment is made of semiconductor materials and the waveguide formed therein is also made of semiconductor materials. Specifically, the optical hybrid, 16x or 16y, provides, on a semi-insulating InP substrate, a lower cladding layer 16b with a thickness of 1.5 μm and doped with silicon; an intermediate layer made of a semi-insulating InP layer 16c, which is doped with irons, having a thickness of 55 nm and a carrier density of $5 \times 10^{15}$ cm$^{-3}$; a core layer 16d made of un-doped InGaAsP with a thickness of 0.5 μm and having a bandgap energy Eg corresponding to 1.05 μm; and an upper cladding layer 16e made of un-doped InP with a thickness of 1.0 μm. The stack from the upper cladding layer 16e to a portion of the lower cladding layer 16b forms a waveguide mesa 16m with a width of 2.5 μm and a height of 2.2 μm; accordingly, the lower cladding layer 26b is removed by a depth of about 0.8 μm in both sides of the mesa 16m. Embedding layers 16f made of resin are provided in the sides of the mesa 16m. In addition, whole of the mesa 16m and the embedding layer 16f are covered with a protecting layer 16g. An InP has refractive index smaller than the refractive index of InGaAsP of the core layer 16d. Moreover, a resin in the sides of the mesa 16m also has refractive index smaller than that of InGaAsP. Accordingly, the core layer 16d and the surrounding regions, 16b, 16e and 16f, form the waveguide structure.

A feature of the waveguide made of semiconductor materials such as that shown in FIG. 3 is that the dimensions of the core layer exposed in the facet of the hybrid, 16x or 16y, have only 2.5 μm×0.5 μm; especially, the height or the thickness thereof is only 0.5 μm. In order to securely couple an optical beam with an optical waveguide whose cross section is extremely narrow, several techniques will be inevitable.

Next, the optical coupling system for a waveguide made of semiconductor materials according to the present invention will be described.

Figure 4A:
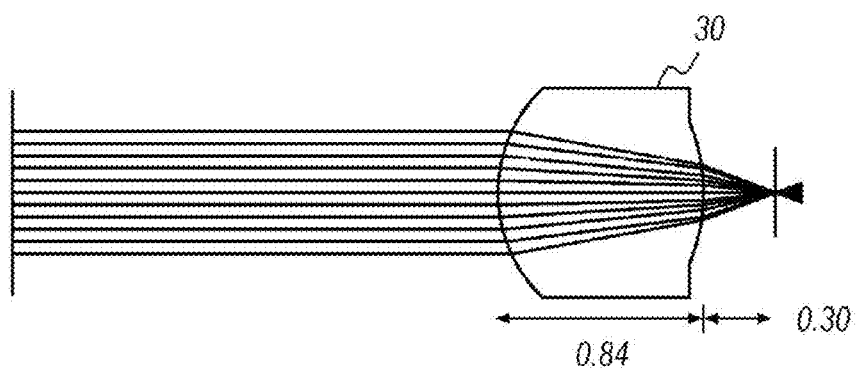
FIGS. 4A and 4B compare an optical coupling system for the waveguide made of semiconductor materials.
Figure 4B:
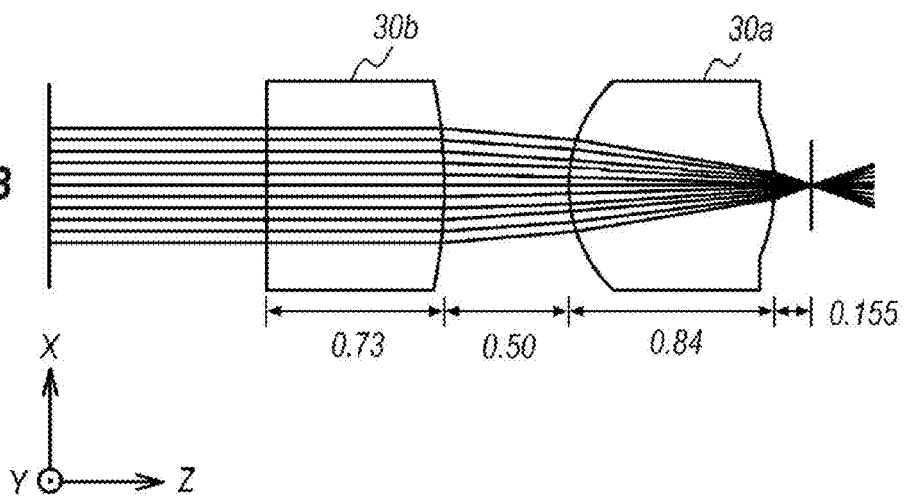

FIGS. 4A and 4B compare an optical coupling system for the waveguide made of semiconductor materials, which provides only one lens (FIG. 4A), and another optical coupling system having two lenses (FIG. 4B). The optical coupling system assumes that the optical axis is along Z-direction, a direction perpendicular to the optical axis and extending in parallel to the surface of the carrier, on which the lenses are mounted, is the X-direction, and the rest direction also perpendicular to the optical axis but perpendicular to the surface of the carrier is the Y-direction.

Figure 5A:
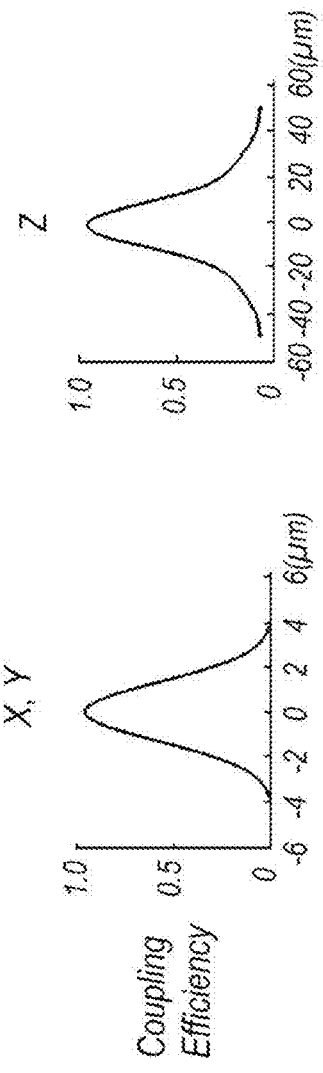
FIGS. 5A and 5B compare the optical coupling tolerances for the one-lens system and those for the two-lens system, respectively.
Figure 5B:
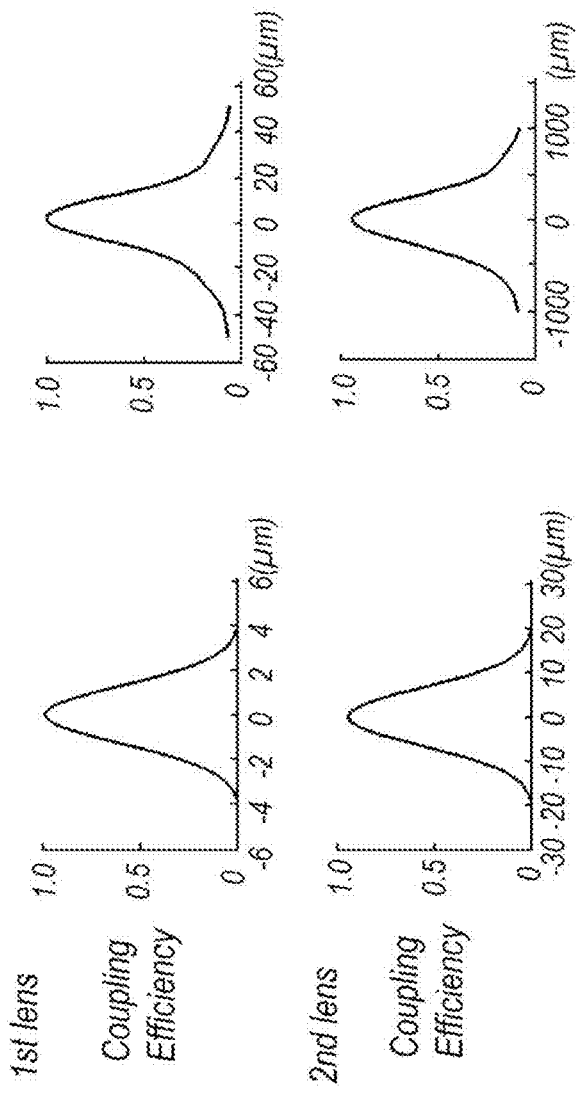

FIGS. 5A and 5B compare the optical coupling tolerances for the one lens system (FIG. 5A) and those for the two-lens system (FIG. 5B). In FIGS. 5A and 5B, the left row and the right row correspond to the X, Y-tolerance and the Z-tolerance, respectively. In FIG. 5B, the behaviors in the upper column correspond to the first lens 30a, while, the behaviors in the lower column show the tolerances of the second lens 30b. The horizontal scales of respective behaviors have a dimension of micron meters, while, the vertical scales are normalized at the maximum coupling efficiency.

For the single-lens system shown in FIG. 4A, the lens 30, which is a type of the aspheric lens with a thickness of 0.84 mm, has focal length of 0.7 mm and a distance from an edge of the lens to the focal point is set to be 0.3 mm. In the optical receiver 10, the facet of the optical waveguide of the optical hybrid is aligned with the focal point of the lens. In the single-lens system, the beam waist at the end of the optical waveguide may have a diameter of about 3 µm, which is comparable to the dimensions of the cross section of the waveguide. The lens is often fixed on the carrier by a resin, typically, an ultraviolet curable resin. Such a resin generally shrinks during the curing by a few micron meters, which causes a deviation of the lens from an aligned position. Referring to behaviors of the coupling efficiency for the deviation along X or Y direction in the single-lens system (FIG. 5A), the deviation of only a few micron meters causes considerable degradation in the coupling efficiency.

For the two-lens system, as shown in FIG. 4B, the first lens 30a is placed closer to the optical hybrid and the second lens 30b is set apart therefrom. Moreover, the second lens 30b has a longer focus compared with the first lens 30a, which means that the second lens 30b has a larger tolerance in the position thereof compared with the first lens 30a. The first lens 30a is first fixed on the carrier with an ultraviolet curable resin; then, the second lens 30b is put on the carrier also by an ultraviolet curable resin. As already described, the first lens 30a inherently causes the deviation during the curing of the resin, but, the second lens 30b may compensate this deviation. The second lens 30b also causes another deviation during the curing. However, the second lens 30b has greater tolerance compared with that of the first lens 30a. Referring to FIG. 5B, the horizontal axis for the second lens has a scale five times greater than that of the first lens and that of the lens in the single-lens system shown in FIG. 5A. Accordingly, the degradation of the optical coupling efficiency may be effectively suppressed or fully compensated by the second lens.

In an example, the first lens 30a has the focal length of 0.7 mm, which is the same as the lens in FIG. 4A, while, the second lens 30b, which is also the type of the aspheric lens, has the focal length of 3.548 mm. Also, the first lens 30a has a thickness of 0.84 mm, and a distance from the surface thereof to the focal point, namely, to the edge of the optical hybrid, is 0.155 mm. The second lens 30b has a thickness of 0.73 mm and a distance from the surface thereof to the end of the first lens 30a is set to be 0.50 mm. Such an optical system may show a field diameter of about 3 µm at the focal point, namely, the facet of the optical hybrid. This field diameter is comparable to that obtained in the single-lens system of FIG. 4A.

Thus, the two-lens system may compensate the deviation of the first lens, which is inevitably caused during the curing of the resin, because the two-lens system widens the positional tolerance of the first lens 30a.

Figure 6:
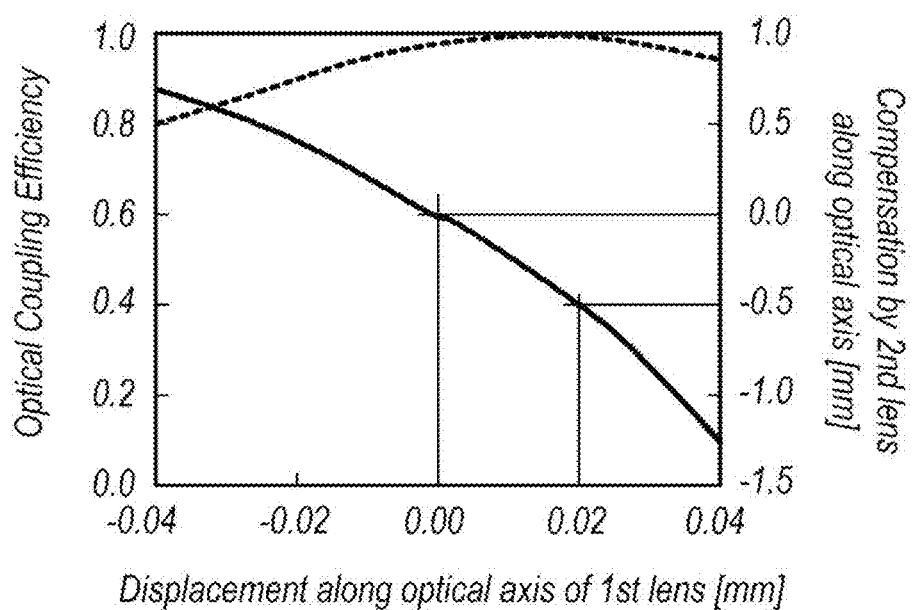
FIG. 6 shows a relation between the deviation of the first lens and the offset of the second lens to compensate the optical coupling efficiency, and the compensated coupling efficiency.

FIG. 6 shows a relation by a solid line between the deviation of the first lens and the offset for the second lens to compensate the optical coupling efficiency, and the compensated coupling efficiency by a broken line. The horizontal axis corresponds to the deviation of the first lens, while, the right vertical axis corresponds to the offset applied to the second lens, and the left vertical axis shows the total or compensated coupling efficiency. The deviation of the first lens and the offset of the second lens are both along the optical axis, namely, Z-direction.

As shown in FIG. 6, when the first lens 30a deviates from the designed position, which causes the degradation of the optical coupling efficiency, the second lens 30b is necessary to recover the degradation. For instance, when the first lens 30a deviates, from the designed position, by 0.02 mm toward the side of the optical hybrid 16x, the second lens is necessary to be offset toward the side opposite to the optical hybrid 16x, namely, the side apart from the first lens 30a, by about 0.5 mm. Then, the optical coupling efficiency is recovered to be about 1.0. Thus, even when the first lens 30a close to the optical hybrid 16x and having lesser tolerance of the optical coupling efficiency deviates the position thereof, the second lens may compensate the reduction of the optical coupling efficiency to a value substantially equal to or sometimes exceeding that before the deviation. Moreover, comparing the deviation of the first lens 30a and the compensation of the second lens 30b, the latter is far greater than the former, for instance, a ratio of the two amounts becomes 0.5/0.02=25 in a case described above. Accordingly, the two-lens system gives a large tolerance for the alignment of the respective lenses even when the subject to be optically coupled with the lens system has an optical input port with limited dimensions like the waveguide of the present embodiment.

(Modifications)

Figure 7A:
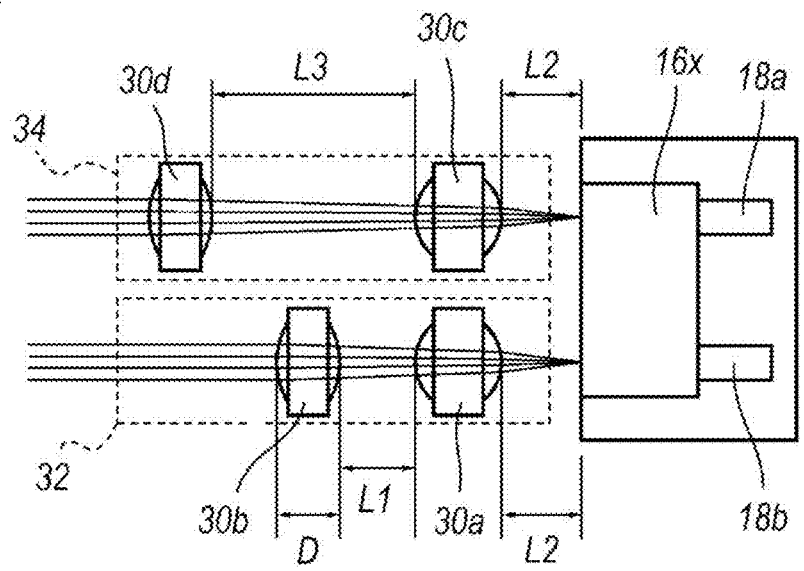
FIGS. 7A and 7B schematically show optical arrangements of the two-lens system modified from that shown in FIG. 2.
Figure 7B:
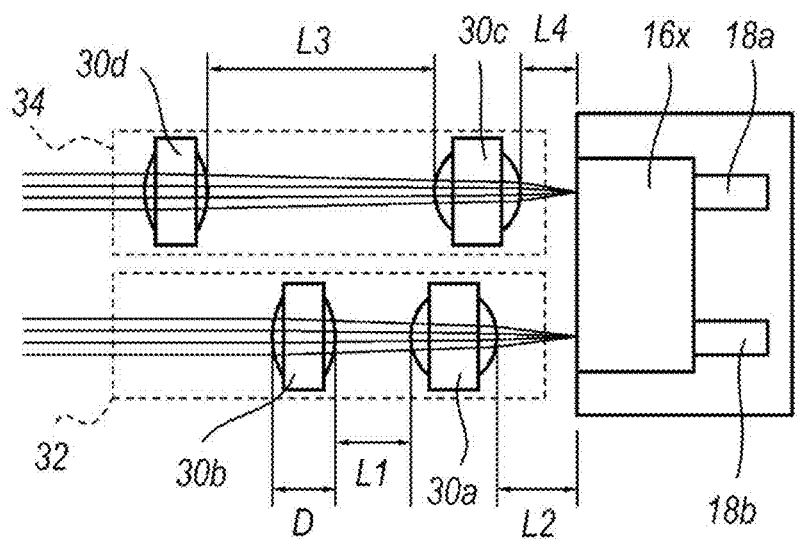

FIGS. 7A and 7B schematically show optical arrangements of the two-lens system modified from that shown in FIG. 2. The optical arrangement shown in FIG. 7A has a feature that two units, 32 and 34, of the two-lens system have respective second lenses, 30b and 30d, different from the other. That is, the distance between the first lens 30a and the optical hybrid 16x is equal to the distance between the first lens 30c and the optical hybrid 16x but the distance between the second lens 30b and the first lens 30a is different from the distance between the second lens 30d and the first lens 30c in respective units, 32 and 34. For the first unit 32, the distance between the first lens 30a and the optical hybrid is L2 and the distance between the first and second lenses, 30a and 30b, is set to be L1. While, in the second unit 34, the former distance is also L2 but the latter, namely, the distance between the first lens 30c and the second lens 30d is set to be L3, which is greater than the distance L1 in the first unit. The second lens 30d of the second unit 34 has the focal length greater than the second lens 30b of the first unit 32. Even in such an arrangement, the second lenses, 30b and 30d, may compensate the deviation of the first lenses, 30a and 30c. Moreover, the second lens 30d in the second unit 34 is apart from the first lens 30c so as to form a space therebetween and in a side of the second lens 30b in the first unit 32, which may enhance the alignment process for the respective second lenses, 30b and 30d.

FIG. 7B shows still another modification of the optical arrangement according to the present invention. The arrangement shown in FIG. 7B has a feature, modified from that shown in FIG. 7A, is that the first lens 30c in the second unit 34 is set closer to the optical hybrid 16x. That is, the distance L4 between the first lens 30c and the optical hybrid 16x in the second unit 34 is shorter than that L2 of the first unit 32. In this arrangement shown in FIG. 7B, the space in the side of the second lens 30b of the first unit 32, namely between the first lens 30c and the second lens 30d in the second unit 34, becomes wider to enhance the productivity of the optical alignment of the two-lens system.

Figure 8:
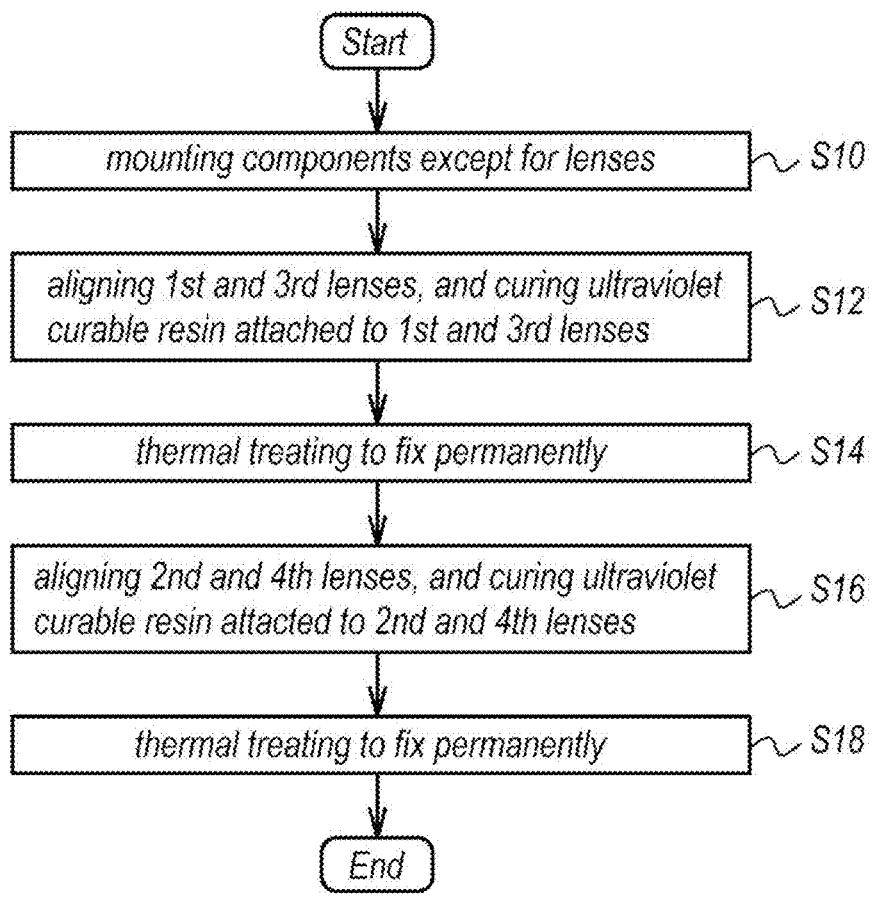
FIG. 8 shows a flow chart to assemble the two-lens system.

FIG. 8 shows a flow chart to assemble the two-lens system thus described as referring to the figures. First, the process mounts optical devices such as the optical hybrid 16x and so on but except for the lenses at step S10. Then the first lenses, 30a and 30c, are optically aligned with the optical hybrid 16x. Specifically, a testing beam that emulates the local beam LO or the signal beam SIG in FIG. 1 is guided to the waveguide of the optical hybrid 16x through the first lenses, 30a and 30c, as practically monitoring the magnitude of the beam by the PDs 18. The first lenses, 30a and 30c, are aligned at respective positions at which the maximum magnitude is detected by the PDs 18. Then, the first lenses, 30a and 30c, are fixed there by illuminating ultraviolet rays to cure the resin applied in the first lenses, 30a and 30c, at step S12. The resin is then hardened by thermal treatment at step S14. In these steps of curing and hardening, the first lenses, 30a and 30c, possibly deviate from the aligned position by several micron meters.

Next, the second lenses, 30b and 30d, are optically aligned such that the magnitude of the beam entering the optical hybrid 16x, passing through the two lenses, 30a and 30b, or 30c and 30d, and detected by the respective PDs 18, becomes the maximum or at least exceeds a preset level. The second lenses, 30b and 30d, may securely recover or compensate the degradation caused by the deviation of the first lenses, 30a and 30c. Then, the second lenses, 30b and 30d, are fixed by curing the resin at step S16. Finally, the second lenses, 30b and 30d, are securely fixed by carrying out the thermal treatment at step S18.

Although the description above concentrates on the side of the X-polarization, the assembly of two lenses for the Y-polarization may be carried out by the same procedures.

Second Embodiment

The second embodiment of the present application is an example where the two-lens system is applied to an optical modulator.

Figure 9:
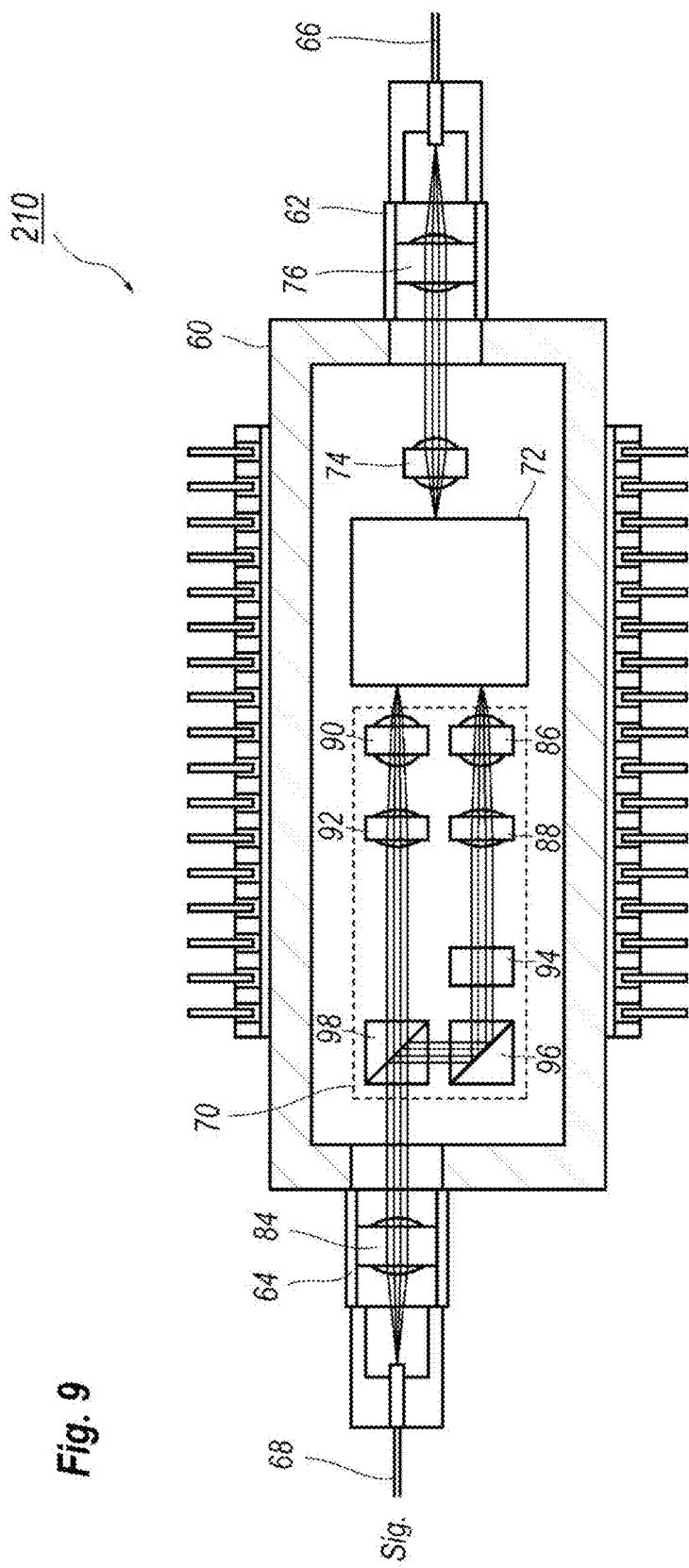
FIG. 9 is a plan view showing an inside of an optical modulator according to the second embodiment of the present invention.

FIG. 9 is a plan view showing an inside of an optical modulator 210 that includes two optical ports, 62 and 64, each coupled with respective optical fibers, 66 and 68; an optical coupling system 70; an optical modulator 72; a lens 74; and a housing 60 for enclosing these optical components, 70 to 74. The optical modulator 210 receives a continuous wave (CW) beam in the input port 62 through the optical fiber 66. The CW beam is converted into a collimated beam by the lens 76, then, focused by the lens 74 on a waveguide in the modulating device 72. The CW beam entering the modulating device 72 is modulated in the phase thereof by electrical signals, and output from two waveguides. The optical coupling system 70, which is coupled with these two waveguides, receives the modulated beams and combines thus received two modulated beams by a polarization beam combiner 98 after converting the polarization direction of one of the beams by 90° by a half-wave plate 94. The combined beam is output from the output port 64 that implements a concentrating lens 84 to concentrate the combined beam on the output fiber 68.

The optical coupling system 70 includes the first lens 86, the second lens 88, and the mirror for one of the modulated beams, and another first lens 90, another second lens 92 for the other of the modulated beams. The two lenses, 86 and 88, and other two lenses, 90 and 92, each converts the diverging modulated beams coming from the modulating device 72 into respective collimated beams.

Figure 10A:
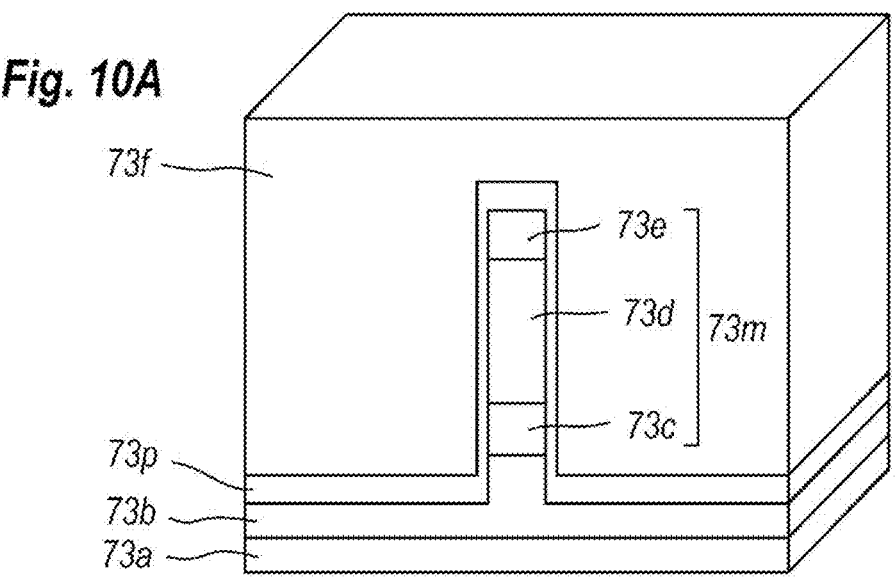
FIGS. 10A and 10B show cross section of examples of the waveguides formed within the modulating device in the optical modulator shown in FIG. 9.
Figure 10B:
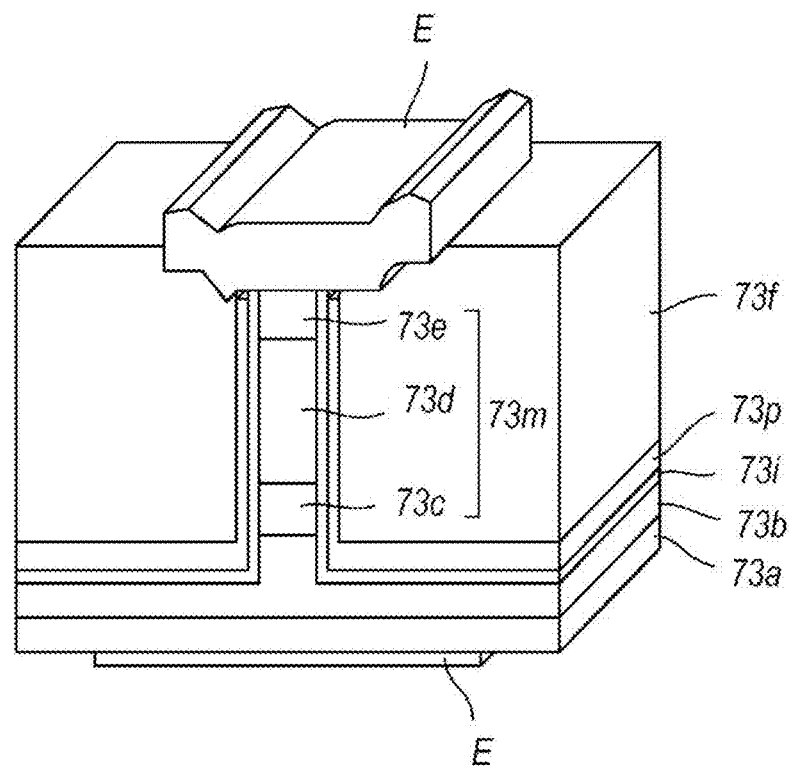

FIGS. 10A and 10B show cross sections of examples of the waveguides formed within the modulating device 72, where FIG. 10A shows the waveguide without an electrode to modulate an optical beam propagating within the waveguide, while, FIG. 10B shows another waveguide accompanied with an electrode. The waveguide shown in FIG. 10A is exposed in the facet of the modulating device 72. The waveguide 72a shown in FIG. 10A provides, on a semiconductor substrate 73a made of an n-type InP, a lower cladding layer 73b made of an n-type InP with a thickness of 3.3 µm; a core layer 73c made of a multiple quantum well (MQW) with a thickness of 0.5 µm, where the MQW core layer includes a plurality of AlGaInAs well layers and a plurality of AlInAs barrier layers stacked alternately to each other; an upper cladding layer 73d made of p-type InP with a thickness of 1.5 µm; and a contact layer 73e made of p$^+$-InGaAs with a thickness of 0.3 µm.

A portion of the lower cladding layer 73b to the contact layer 73e forms a waveguide mesa 73m with a width of 1.5 µm. Both sides of the waveguide mesa 73m is buried by an embedding layer 73f made of resin via a protection layer 73p of SiO$_2$ with a thickness of 0.3 µm. Among the layers described above, the core layer 73c has the greatest refractive index compared with layers surrounding the core layer 73. Thus, the waveguide structure is realized with dimensions of a 1.5 µm width and a 0.5 µm thickness. The waveguide mesa 73m in the portion with the electrode E is further covered with an intermediate layer 73i made of InP with a thickness of 0.2 to 0.3 µm.

Because the waveguide exposed at the facet of the modulating device 72 has such narrowed dimensions, the modulated beam output from the face becomes a divergent beam. The two-lens system according to the present invention may effectively convert such a divergent beam into a collimated beam, and the optical coupling system 70 provided in the downstream of the modulating device 72 may easily and securely combine the two collimated beams.

Although not explicitly illustrated in FIG. 9, the optical modulator 210 may provide the two-lens system between the input port 62 and the input of the modulating device 72 to couple the input beam from the optical fiber to the waveguide in the modulating device 72. The modulating device 72 is made of semiconductor material having the refractive index thereof greater than that of dielectric materials, typically lithium niobate (LiNbO$_3$), applicable to conventional modulating device, which means that the dimensions or the cross section of the waveguide core for transmitting light with the single mode is reduced. In the present embodiments, the core dimensions of the optical hybrid 16 is 2.5 µm×0.5 µm, while, that of the modulating device 72 is 1.5 µm×0.5 µm. The optical coupling efficiency to such narrowed cores becomes hard by the single-lens system; while, in the two-lens system of the present invention, the second lens to be set far from the optical hybrid and the modulating device may compensate the deviation of the first lens inevitably induced during the hardening of the resin to fix the first lens on the carrier. Accordingly, although the count of the optical components increases by only one; the optical alignment or the manufacturing of optical module may be improved.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method to couple a collimated beam with a core of an optical waveguide made of semiconductor materials, the core having sub-micron dimensions, comprising steps of:
   aligning a first lens with the core by concentrating the collimated beam on the core;
   fixing the first lens by curing an ultraviolet curable resin attached to the first lens and subsequent heat treatment;
   compensating deviations induced in the first lens during the fixation thereof by setting the second lens outside of the first lens with respect to the optical waveguide; and
   fixing the second lens by curing an ultraviolet curable resin attached to the second lens and subsequent heat treatment.

2. A method of assembling an optical receiver that receives an optical signal with a collimated configuration, the optical receiver including a carrier that mounts an optical device and an optical coupling system, the optical device including an optical waveguide made of semiconductor materials, the core having sub-micron dimensions, the optical coupling system including a first lens and a second lens that optically couples the optical signal with the optical waveguide of the optical device combined with the first lens, the method comprising steps of:
   aligning the first lens on the carrier with respect to the core of the optical waveguide;
   illuminating a ultraviolet curable resin for the first lens with ultraviolet rays for curing the ultraviolet curable resin for the first lens that is applied between the first lens and the carrier;
   heat-treating the ultraviolet curable resin for hardening the ultraviolet curable resin;
   placing the second lens in a position on the carrier outside of the optical device with respect to the first lens, the second lens compensating deviations induced in the first lens during the step of heat-treating the ultraviolet curable resin for the first lens;
   illuminating an ultraviolet curable resin for the second lens with ultraviolet rays for curing the ultraviolet curable resin for the second lens that is applied between the second lens and the carrier; and
   heat-treating the ultraviolet curable resin for the second lens to fix the second lens with the carrier.

3. The method according to claim 2,
further including a step of, before step of aligning the first lens, applying ultraviolet curable resin in a position on the carrier where the first lens is to be placed.

4. The method according to claim 2,
further including a step of, before step of aligning the second lens, but after step of illuminating the ultraviolet rays onto the ultraviolet curable resin for the first lens, applying the ultraviolet curable resin in a position on the carrier where the second lens is to be placed.

5. The method according to claim 2,
wherein the step of aligning the first lens is carried out by monitoring a test beam that emulates the optical signal with a photodetector implemented within the optical device, and placing the first lens in a position where the test beam passing the first lens, entering the optical waveguide, and monitored by the photodetector becomes a maximum.

6. The method according to claim 2,
wherein the first lens has a focal length shorter than a focal length of the second lens.

7. The method according to claim 2,
wherein the first lens and the second lens are asymmetrical lens that concentrate an optical signal entering therein.

* * * * *